United States Patent
Uchiyama et al.

(10) Patent No.: US 8,524,417 B2
(45) Date of Patent: Sep. 3, 2013

(54) ELECTRICITY-GENERATION DEVICE

(75) Inventors: Naoki Uchiyama, Hamamatsu (JP); Yasuyuki Uchiyama, Hamamatsu (JP); Seigou Nakabayashi, Hamamatsu (JP)

(73) Assignee: Kabushiki Kaisha Atsumitec, Shizuoka (JP)

( * ) Notice: Subject to any disclaimer, the term of this patent is extended or adjusted under 35 U.S.C. 154(b) by 0 days.

(21) Appl. No.: 13/640,240

(22) PCT Filed: Feb. 21, 2011

(86) PCT No.: PCT/JP2011/053678
§ 371 (c)(1), (2), (4) Date: Oct. 9, 2012

(87) PCT Pub. No.: WO2011/125377
PCT Pub. Date: Oct. 13, 2011

(65) Prior Publication Data
US 2013/0029251 A1   Jan. 31, 2013

(30) Foreign Application Priority Data
Apr. 7, 2010 (JP) .................................. 2010-088647

(51) Int. Cl.
*H01M 8/10* (2006.01)
*H01M 8/12* (2006.01)

(52) U.S. Cl.
USPC ............................. 429/513; 429/465; 429/466

(58) Field of Classification Search
None
See application file for complete search history.

(56) References Cited

U.S. PATENT DOCUMENTS

| | | | |
|---|---|---|---|
| 6,296,963 B1 * | 10/2001 | Nanjo | 429/458 |
| 2003/0134171 A1 * | 7/2003 | Sarkar et al. | 429/31 |
| 2004/0166386 A1 * | 8/2004 | Herman et al. | 429/22 |
| 2005/0089731 A1 * | 4/2005 | Ogiwara et al. | 429/19 |

FOREIGN PATENT DOCUMENTS

| | | | |
|---|---|---|---|
| JP | 9-274928 | | 10/1997 |
| JP | 2000-156239 | | 6/2000 |
| JP | 2001-229933 | | 8/2001 |
| JP | 2002358996 A | * | 12/2002 |
| JP | 2007-200703 | | 8/2007 |
| JP | 2009-512158 | | 3/2009 |

* cited by examiner

*Primary Examiner* — Patrick Ryan
*Assistant Examiner* — Jose Colucci Rios
(74) *Attorney, Agent, or Firm* — Cozen O'Connor

(57) ABSTRACT

An electricity generation device (1) using a fuel cell (2) having a fuel electrode (5) and an air electrode (6) to which a fuel gas and air are supplied, respectively, includes: a fuel gas conduit (3) through which the fuel gas flows; a cover (9) configured to cover an outside of the fuel gas conduit (3) and cooperating with a peripheral wall (8a) of the fuel gas conduit (3) to form an air passage (4) therebetween, the air passage extending along the fuel gas conduit (3); an air inlet hole (10) formed through the cover (9) to allow air to flow into the air passage (4); and an air outlet hole (11) provided downstream of the air electrode exposed to the air passage (4), to cause the fuel gas conduit (3) and the air passage (4) to communicate with each other.

4 Claims, 2 Drawing Sheets

US 8,524,417 B2

ELECTRICITY-GENERATION DEVICE

RELATED APPLICATIONS

This is a U.S. National Phase Application under 35 USC 371 of International Application PCT/JP2011/053678 filed on Feb. 21, 2011.

This application claims the priority of Japanese application no. 2010-088647 filed Apr. 7, 2010, the content of which is hereby incorporated by reference.

TECHNICAL FIELD

The present invention relates to an electricity generation device for generating electricity by supplying a fuel gas to a fuel electrode of a fuel cell thereof.

BACKGROUND ART

A fuel cell comprises a fuel electrode and an air electrode sandwiching an electrolyte. A fuel gas or the like is supplied to the electrodes to generate electricity. In a solid oxide fuel cell (SOFC), in particular, a fuel electrode (hydrogen electrode) and an air electrode (oxygen electrode) are joined to an electrolyte made of a solid oxide. The fuel electrode is supplied with a fuel gas and the air electrode is supplied with air or the like, whereby high-output electric power can be generated. The solid oxide fuel cell can use, as the fuel gas, not only hydrogen gas but a gas containing a large amount of carbon monoxide (e.g., exhaust gas of a motor vehicle driven by an internal combustion engine).

Such a solid oxide fuel cell is disclosed in Patent Document 1. In the disclosed fuel cell, the fuel and air electrodes are exposed to the internal spaces of respective different chambers to be supplied with hydrogen and oxygen, respectively. The solid oxide fuel cell with such a configuration is referred to as a dual-chamber type. In the case of arranging the dual-chamber SOFC in an exhaust pipe through which exhaust gas flows, hydrogen is let into the fuel electrode-side chamber by utilizing the flow of the exhaust gas, and oxygen is fed into the air electrode-side chamber by using a pump or the like.

It is not desirable, however, to use a pump or the like to supply the air electrode with oxygen contained in air, because the device as a whole is increased in size. The air electrode may be exposed to the atmosphere in order to dispense with the pump or the like, but from the standpoint of protection of the air electrode, the air electrode should preferably be arranged in a chamber. Accordingly, there has been a demand for methods whereby an air electrode arranged in a chamber can be efficiently supplied with oxygen contained in air without the need to use a separate air supply device.

PRIOR ART DOCUMENT

Patent Document

Patent Document 1: Japanese Laid-open Patent Publication No. 2000-156239

SUMMARY OF THE INVENTION

Problems to be Solved by the Invention

The present invention provides an electricity generation device whereby an air electrode arranged in a chamber can be efficiently supplied with oxygen contained in air without the need to use a separate air supply device.

Means for Solving the Problems

To achieve the object, the present invention provides an electricity generation device using a fuel cell having a fuel electrode and an air electrode to which a fuel gas and air are supplied, respectively, the electricity generation device comprising: a fuel gas conduit through which the fuel gas flows; a cover configured to cover an outside of the fuel gas conduit and cooperating with a peripheral wall of the fuel gas conduit to form an air passage therebetween, the air passage extending along the fuel gas conduit; an air inlet hole formed through the cover to allow air to flow into the air passage; and an air outlet hole provided downstream of the air electrode exposed to the air passage, to cause the fuel gas conduit and the air passage to communicate with each other.

Preferably, the fuel electrode forms an inner pipe, the cover forms an outer pipe cooperating with the inner pipe to constitute a double pipe structure, and the outer pipe is fixed to a fuel gas pipe continuous with the inner pipe and passing the fuel gas therethrough.

The air inlet hole preferably includes a plurality of air inlet holes.

Also, preferably, the fuel gas is exhaust gas of a motor vehicle.

Advantageous Effects of the Invention

According to the present invention, the air outlet hole communicating with the fuel gas conduit is provided at the downstream side of the air passage. Thus, when the fuel gas is flowing at high speed through the fuel gas conduit, negative pressure is generated via the air outlet hole, so that the air in the air passage flows out into the fuel gas conduit. As a result, a unidirectional flow of air is created in the air passage, and since air can be efficiently supplied to the air electrode, electricity generation efficiency can be improved. The flow of air created by making use of the negative pressure is gentle, and therefore, the fuel gas is not cooled by the air, enabling electricity generation at high temperatures. Consequently, the electricity generation efficiency can be further improved.

Also, according to the present invention, the double pipe structure is employed which is constituted by the inner pipe for passing the fuel gas and the outer pipe for passing air, and therefore, the electricity generation device as a whole can be made compact in size. Since the outer pipe is fixed to the fuel gas pipes located upstream and downstream thereof as viewed in the flowing direction of the fuel gas, the material of the outer pipe may be selected taking account only of strength. A suitable material can therefore be selected for the outer pipe so as to prevent deterioration with use.

Further, according to the present invention, a plurality of air inlet holes are formed through the cover. This permits a larger amount of air to be introduced into the air passage, making it possible efficiently supply air to the air electrode.

According to the present invention, moreover, the fuel gas may be exhaust gas of a motor vehicle, and in this case, hydrocarbons and the like contained in the exhaust gas can be used. Further, a considerably high flow velocity of the exhaust gas makes it easier to create the flow of air by the negative pressure generated via the air outlet hole.

MODE FOR CARRYING OUT THE INVENTION

Figure 1:
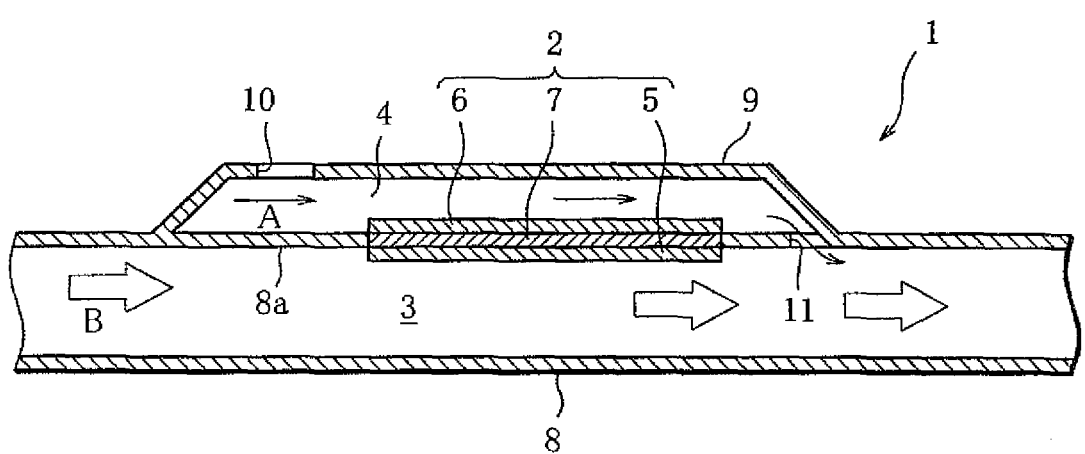
FIG. 1 is a schematic sectional view of an electricity generation device according to the present invention.

As illustrated in FIG. 1, an electricity generation device 1 according to the present invention includes a fuel cell 2, a fuel gas conduit 3, and an air passage 4. The fuel cell 2 has a fuel electrode 5, an air electrode 6, and an electrolyte 7 sandwiched between the electrodes 5 and 6 in close contact therewith. The fuel electrode 5 is exposed to the internal space of the fuel gas conduit 3 and is supplied with a fuel gas flowing through the fuel gas conduit 3 in a direction indicated by arrows B. The air electrode 6 is exposed to the internal space of the air passage 4 and is supplied with air flowing through the air passage 4 in a direction indicated by arrows A. Thus, the air electrode 6 reduces oxygen contained in air, and the reduced oxygen ions pass through the electrolyte 7 and react, at the fuel electrode 5, with hydrogen contained in the exhaust gas, thus producing water. Electrons produced at the fuel electrode 5 at this time move through a circuit (not shown) and again ionize oxygen at the air electrode 6, so that electric current flows through the circuit, generating electricity. The electrolyte 7 is, for example, a solid oxide, and in this case, the fuel cell 2 is a solid oxide fuel cell (SOFC). Especially in the case of using exhaust gas as the fuel gas, an SOFC is preferably used because the SOFC withstands high temperature, requires no catalyst, and can be reduced in size because of its high output density. Also, where exhaust gas is used as the fuel gas, a fuel reforming material (not shown) is preferably arranged in the fuel gas conduit 3 at a location upstream of the fuel electrode 5. The fuel reforming material is used for converting hydrocarbons, water and the like, contained in the exhaust gas, into hydrogen to increase the concentration of hydrogen.

The fuel gas conduit 3 is formed by a hollow cylindrical inner pipe 8. The air passage 4 is separated from the fuel gas conduit 3 by a peripheral wall 8a of the inner pipe 8 and is surrounded by a cover 9 covering part of the peripheral wall 8a. That is, the air passage 4 is formed by the peripheral wall 8a and the cover 9. An air inlet hole 10 is formed through the cover 9 to allow air to be introduced into the air passage 4. Accordingly, the air inlet hole 10 serves as an upstream end of the air passage 4. An air outlet hole 11 is formed through that portion of the inner pipe 8 which is located downstream of the air electrode 6 exposed to the air passage (in the figure, at the downstream end of the air passage 4), to cause the air passage 4 and the fuel gas conduit 3 to communicate with each other.

Thus, the air outlet hole 11 communicating with the fuel gas conduit 3 is provided at the downstream side of the air passage 4, and accordingly, when the fuel gas is flowing at high speed through the fuel gas conduit 3, negative pressure is generated via the air outlet hole 11, so that the air in the air passage 4 flows out into the fuel gas conduit 3. As a result, a unidirectional flow of air is created in the air passage 4, and since air can be efficiently supplied to the air electrode 6, electricity generation efficiency can be improved. Also, the flow of air created by making use of the negative pressure is gentle, and therefore, the fuel gas is not cooled by the air, enabling electricity generation at high temperatures. Consequently, the electricity generation efficiency can be further improved. Although the flow of air is gentle, air contains about 21% oxygen, and accordingly, no problem arises in respect of the amount of oxygen supplied to the air electrode 6. Also, where the exhaust gas of a motor vehicle is used as the fuel gas, a considerably high flow velocity of the exhaust gas makes it easier to create the flow of air by the negative pressure generated via the air outlet hole 11. In this case, the fuel electrode 5 is supplied with hydrocarbons and the like contained in the exhaust gas.

Figure 2:
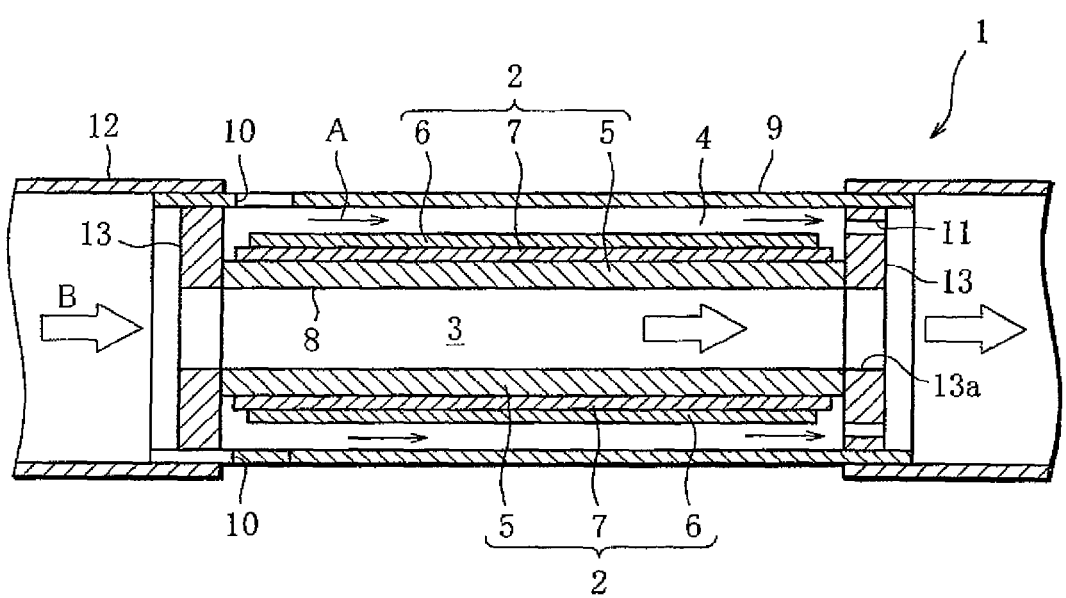
FIG. 2 is a schematic sectional view of another electricity generation device according to the present invention.

As illustrated in FIG. 2, the cover 9 may alternatively be a hollow cylindrical member having a larger diameter than the inner pipe 8 so that the cover 9 and the inner pipe 8 may constitute a double pipe structure of what is called a tube type electricity generation device. In this case, the cover 9 serves as an outer pipe surrounding the inner pipe 8. The air passage 4 is defined between the inner and outer pipes 8 and 9 and has opposite ends closed by respective lids 13. The lid 13 located at the downstream side of the air passage 4 has air outlet holes 11 penetrating therethrough in the longitudinal direction of the pipes 8 and 9. The tube type electricity generation device 1 having such a double pipe structure is arranged in an intermediate portion of a fuel gas pipe 12 through which the fuel gas flows. That is, the fuel gas conduit 3 is formed by the inner pipe 8 and the upstream- and downstream-side fuel gas pipes 12 continuous with the inner pipe 8 and extending from the respective opposite ends of the inner pipe 8. The outer pipe 9 is fixed at its opposite ends to the respective fuel gas pipes 12. In the illustrated example, the fuel electrode 5 serves also as the inner pipe 8. That is, the fuel electrode 5 has a hollow cylindrical shape so as to form the fuel gas conduit 3. A central hole 13a formed through each annular lid 13 also forms part of the inner pipe 8.

In this manner, the double pipe structure is employed which is constituted by the inner pipe 8 for passing the fuel gas and the outer pipe 9 for passing air, and therefore, the electricity generation device as a whole can be made compact in size. Also, since the outer pipe 9 is fixed to the fuel gas pipes 12 located upstream and downstream thereof as viewed in the flowing direction of the fuel gas, the material of the outer pipe 9 may be selected taking account only of strength. A suitable material can therefore be selected for the outer pipe 9 so as to prevent deterioration with use. For example, metal, high-strength ceramic or the like may be used as the material of the outer pipe 9. Also, the outer pipe (cover) 9 may have a plurality of air inlet holes 10 formed therethrough. This permits a larger amount of air to be introduced into the air passage 4, making it possible efficiently supply air to the air electrode 6.

EXPLANATION OF REFERENCE SIGNS 1 electricity generation device
2 fuel cell
3 fuel gas conduit
4 air passage
5 fuel electrode
6 air electrode
7 electrolyte
8 inner pipe
8a peripheral wall
9 cover (outer pipe)
10 air inlet hole
11 air outlet hole
12 fuel gas pipe
13 lid
13a central hole

The invention claimed is:
1. An electricity generation device using a fuel cell having a fuel electrode and an air electrode to which a fuel gas and air are supplied, respectively, comprising:
   a fuel gas conduit through which the fuel gas flows;
   a cover configured to cover an outside of the fuel gas conduit and cooperating with a peripheral wall of the fuel gas conduit to form an air passage therebetween, the air passage extending along the fuel gas conduit;

an air inlet hole formed through the cover to allow air to flow into the air passage; and an air outlet hole provided downstream of the air electrode exposed to the air passage, to cause the fuel gas conduit and the air passage to communicate with each other, wherein the air outlet hole is configured to create a flow of air in the air passage from a flow of the fuel gas through the fuel gas conduit.

2. The electricity generation device according to claim 1, wherein:

the fuel electrode forms an inner pipe, the cover forms an outer pipe cooperating with the inner pipe to constitute a double pipe structure, and the outer pipe is fixed to a fuel gas pipe continuous with the inner pipe and passing the fuel gas therethrough.

3. The electricity generation device according to claim 1, wherein the air inlet hole includes a plurality of air inlet holes.

4. The electricity generation device according to claim 1, wherein the fuel gas is exhaust gas of a motor vehicle.

\* \* \* \* \*